United States Patent
Yamamoto

(10) Patent No.: US 12,407,796 B2
(45) Date of Patent: Sep. 2, 2025

(54) SURROUNDING IMAGE DISPLAY APPARATUS THAT DISPLAYS SURROUNDING IMAGE WHEN DRIVER INTENDS TO MAKE A LANE DEPARTURE AND METHOD

(71) Applicants: TOYOTA JIDOSHA KABUSHIKI KAISHA, Toyota (JP); DENSO CORPORATION, Kariya (JP)

(72) Inventor: Yuki Yamamoto, Toyota (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 106 days.

(21) Appl. No.: 18/367,732

(22) Filed: Sep. 13, 2023

(65) Prior Publication Data
US 2024/0098227 A1    Mar. 21, 2024

(30) Foreign Application Priority Data
Sep. 16, 2022  (JP) .................. 2022-148136

(51) Int. Cl.
  *H04N 7/18* (2006.01)
  *B60R 1/27* (2022.01)
(52) U.S. Cl.
  CPC .............. *H04N 7/188* (2013.01); *B60R 1/27* (2022.01); *B60R 2300/105* (2013.01); *B60R 2300/8026* (2013.01)

(58) Field of Classification Search
  CPC .......... H04N 7/188; H04N 7/18; H04N 7/183; B60R 1/27; B60R 2300/105; B60R 2300/8026; B60R 1/00
  See application file for complete search history.

(56) References Cited

U.S. PATENT DOCUMENTS

| | | |
|---|---|---|
| 9,969,261 B2 | 5/2018 | Kodama |
| 10,045,173 B1 | 8/2018 | Morimura |
| 10,106,157 B2 | 10/2018 | Sawada |
| 10,150,407 B2 | 12/2018 | Takahashi |
| 10,696,297 B2 | 6/2020 | Nguyen Van |
| 11,001,255 B2 | 5/2021 | Fukuman |
| 11,110,937 B2 | 9/2021 | Kinoshita |
| 2012/0242834 A1* | 9/2012 | Satoh ............... G06T 11/00 348/148 |

(Continued)

FOREIGN PATENT DOCUMENTS

| | | | | |
|---|---|---|---|---|
| JP | 2017147505 A | * | 8/2017 | ............. H04N 23/90 |
| JP | 2019-110389 A | | 7/2019 | |

(Continued)

*Primary Examiner* — James M Pontius
(74) *Attorney, Agent, or Firm* — Dinsmore & Shohl LLP

(57) ABSTRACT

A surrounding image display apparatus that comprises an imaging device that captures an image of a surrounding of a vehicle, a display device that displays a surrounding image captured by the imaging device, and an electronic control unit that controls the display device, the electronic control unit being configured to start displaying the surrounding image when it is determined that a driver intends to make a lane departure, and end the displaying of the surrounding image when it is determined that the driver has performed a steering operation without visually confirming a situation of a blind spot on the side of the lane departure.

5 Claims, 5 Drawing Sheets

(56) References Cited

U.S. PATENT DOCUMENTS

2019/0001968 A1    1/2019   Yorifuji
2019/0344828 A1  11/2019  Omori
2019/0389488 A1  12/2019  Yamada
2020/0369205 A1  11/2020  Nakai
2023/0012629 A1*  1/2023  Shin .................... G06V 20/588
2024/0187556 A1*  6/2024  Yamamoto ........... G06V 20/588

FOREIGN PATENT DOCUMENTS

| KR | 20130117430 A | * | 10/2013 | ............ B60W 40/02 |
| KR | 101353541 B1 | * | 1/2014 | ............... B60R 1/00 |
| KR | 20140033647 A | * | 3/2014 | ............... B60R 1/00 |

\* cited by examiner

SURROUNDING IMAGE DISPLAY APPARATUS THAT DISPLAYS SURROUNDING IMAGE WHEN DRIVER INTENDS TO MAKE A LANE DEPARTURE AND METHOD

CROSS-REFERENCE TO RELATED APPLICATION

This application claims priority to Japanese Patent Application No. JP2022-148136 filed on Sep. 16, 2022, the content of which is hereby incorporated by reference in its entirety into this application.

BACKGROUND

1. Technical Field

The present disclosure relates to a surrounding image display apparatus and method, and a non-transitory computer-readable storage medium storing a program for executing a surrounding image display control.

2. Description of the Related Art

As one of driving support devices for vehicles such as automobiles, a surrounding image display apparatus has been known that displays a surrounding image such as a rear image and a side image captured by an imaging device on a display device in a situation where a driver intends to make a lane departure, such as when changing lanes or turning left or right.

For example, Japanese Patent Application Laid-open No. 2019-110389 describes a surrounding image display apparatus configured to display a surrounding image on a display device and to switch the displayed image based on a driver's operation of a turn lever, a touch sensor, or the like.

According to this type of surrounding image display apparatus, a driver can look at an image displayed on a display device by directing his or her line of sight toward the display device, thereby allowing the driver to easily confirm a situation of the rear or the like of a vehicle without significantly changing a direction of a head or a posture of an upper body.

Since a range that can be captured by an imaging device and the number of images that can be displayed on the display device are limited, there is a blind spot area where a situation cannot be confirmed even by looking at the image displayed on the display device. Therefore, if the driver gazes at the image displayed on the display device in a situation where the driver intends to make a lane departure, there is a risk that the driver will neglect to confirm a situation around the vehicle, especially a situation in the blind spot area.

SUMMARY

The present disclosure provides a surrounding image display apparatus and method improved so as to reduce a possibility that a driver will neglect to confirm a situation of a blind spot area when the driver intends to make a lane departure.

According to the present disclosure, a surrounding image display apparatus is provided that comprises an imaging device that captures an image of a surrounding of a vehicle, a display device that displays a surrounding image captured by the imaging device, and an electronic control unit that controls the display device.

The electronic control unit is configured to start displaying the surrounding image when it is determined that a driver intends to make a lane departure, and end the displaying of the surrounding image when it is determined that the driver has performed a steering operation without visually confirming a situation of a blind spot on the side of the lane departure.

According to the present disclosure, a surrounding image display method is provided that comprises a step of displaying a surrounding image captured by an imaging device that captures an image of a surrounding of a vehicle on a display device.

The surrounding image display method further comprises a step of starting displaying the surrounding image when it is determined that a driver intends to make a lane departure, and a step of ending the displaying of the surrounding image when it is determined that the driver has performed a steering operation without visually confirming a situation of a blind spot on the side of the lane departure.

Further, according to the present disclosure, a non-transitory computer-readable storage medium storing a program for executing a surrounding image display control is provided. The program causes the computer to implement a step of displaying a surrounding image captured by an imaging device that captures an image of a surrounding of the vehicle.

The program further comprises a step of starting displaying the surrounding image when it is determined that a driver intends to make a lane departure, and a step of ending the displaying of the surrounding image when it is determined that the driver has performed a steering operation without visually confirming a situation of a blind spot on the side of the lane departure.

According to the above surrounding image display apparatus and method, and the non-transitory computer-readable storage medium, when it is determined that a driver intends to make a lane departure, displaying of the surrounding image is started, and when it is determined that the driver has performed a steering operation without visually confirming a situation of a blind spot area on the side of the lane departure, the displaying of the surrounding image ends. Therefore, since the driver cannot see the surrounding image, a possibility of the driver visually confirming a situation of a blind spot area on the side of the lane departure is increased, which enables to reduce the possibility that the driver will neglect to confirm the situation of the blind spot area when the driver intends to make a lane departure. Incidentally, 'visually confirming a situation' means to confirm a situation by visual observation directly or by way of a mirror without looking at a display device.

In one aspect of the present disclosure, the electronic control unit is configured to determine that the driver intends to make a lane departure when it is determined that the driver has confirmed the rear of the vehicle using a rearview mirror and tilted a turn lever within a preset determination time.

In general, when a driver intends to make a lane departure, the driver confirms the rear of a vehicle using a rearview mirror and tilts a turn lever as a series of actions. Therefore, it can be determined whether or not the driver intends to make a lane departure by determining whether or not the driver has confirmed the rear of the vehicle using the rearview mirror and tilted the turn lever within a preset determination time.

According to the above aspect, when it is determined that a confirming of the rear by the rear view mirror and a tilting operation of the turn lever have been performed by the driver within the preset determination time, it is determined that the driver intends to make the lane departure. Therefore, when the driver intends to deviate from the lane, it is possible to determine that the driver intends to make the lane departure.

In another aspect of the present disclosure, the electronic control unit is configured to end the displaying of the surrounding image when it is determined that the driver gazes at the display device for a preset reference time or more.

If a driver gazes at a display device for a long period of time, the possibility of the driver visually confirming a situation of a blind spot on the side of the lane departure decreases.

According to the above aspect, when it is determined that the driver gazes at the display device for a preset reference time or more, the display of the surrounding image is terminated. Therefore, since the driver can no longer see the surrounding image, it is possible to increase the possibility that the driver confirms the situation of the blind spot area on the side of the lane departure by visual observation.

Other objects, other features and attendant advantages of the present disclosure will be readily understood from the description of the embodiments of the present disclosure described with reference to the following drawings.

DETAILED DESCRIPTION

Referring to the accompanying drawings, a surrounding image display apparatus and method according to the embodiments of the present disclosure will be described in detail.

First Embodiment

Figure 1:
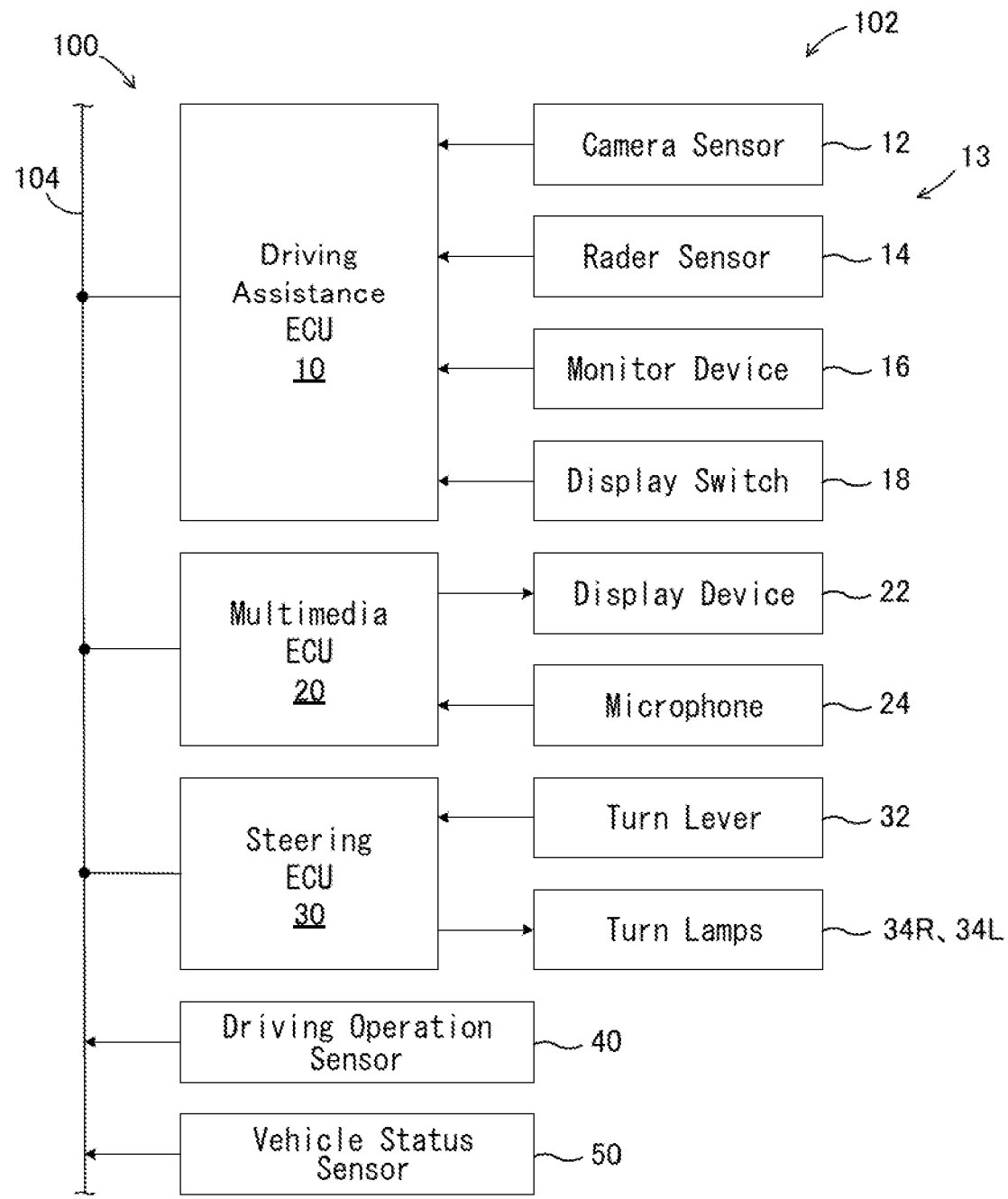
FIG. 1 is a schematic configuration diagram showing a surrounding image display apparatus according to the first embodiment.

As shown in FIG. 1, a surrounding image display apparatus 100 according to the first embodiment of the present disclosure is applied to a vehicle 102 and includes a driving assistance ECU 10. The vehicle 102 may be a vehicle capable of automatic driving and includes a multimedia ECU 20 and a steering ECU 30. The ECU is an electronic control unit comprising a microcomputer as its main part. In the following description, the vehicle 102 is referred to as an own vehicle 102 as required in order to distinguish it from other vehicles.

The microcomputer in each ECU includes a CPU, a ROM, a RAM, readable and writable non-volatile memories (N/M), interfaces (I/F), and the like. The CPU realizes various functions by executing instructions (programs and routines) stored in the ROM. Furthermore, these ECUs are connected to each other so as to be data-interchangeable (communicating) via a CAN (Controller Area Network) 104. Thus, information supplied by sensors (including switches) connected to a particular ECU may be transmitted to other ECUs.

The driving assistance ECU 10 is a main electronic control unit which carries out driving assistance controls such as lane deviation prevention control and inter-vehicular distance control. In the embodiment, the driving assistance ECU 10 cooperates with other ECUs to perform surrounding image display control so as to improve security when making a lane departure, as will be more fully described below.

The driving assistance ECU 10 is connected with a camera sensor 12, a radar sensor 14 and a monitor device 16. The camera sensor 12 functions as an imaging device that captures an image of a surrounding of the own vehicle 102. The camera sensor 12 and the radar sensor 14 function as a target information acquiring device 13 that acquires target information around the own vehicle 102. The camera sensor 12 includes four camera sensors that capture front, rear, right and left side areas of the vehicle, but is not limited to four. The radar sensor 14 includes five radar sensors that acquire target information of a solid object in the forward area, the right front area, the left front area, the right rear area, and the left rear area, but is not limited to five.

Although not shown in the figure, each camera sensor of the camera sensor 12 includes a camera unit for capturing a surrounding of the vehicle 102 and a recognition unit for recognizing a target such as a white line of a road and another vehicle by analyzing an image data obtained by capturing by the camera unit. The recognition unit supplies information about the recognized target to the driving assistance ECU 10 at predetermined time intervals.

Although not shown in the figure, each radar device of the radar sensor 14 includes a radar transceiver and a signal processing unit. The radar transceiver radiates a millimeter-wave band radio wave (hereinafter, referred to as "millimeter wave") toward the surrounding of the vehicle 102, and receives millimeter waves (i.e., reflected waves) reflected by a solid object (e.g., another vehicle, a bicycle, etc.) present in a radiation range. The signal processor acquires information representing a relative distance and a relative velocity between the own vehicle and the solid object, a relative position (direction) of the solid object with respect to the own vehicle, and supplies the acquired information to the driving assistance ECU 10 at predetermined time intervals based on a phase difference between the radiated millimeter wave and the received reflected wave, an attenuation level of the reflected wave, and a time from the radiation of the millimeter wave to the reception of the reflected wave. In place of or in addition to the radar sensor 14, LiDAR (Light Detection And Ranging) may be used.

The monitor device 16 includes a driver imaging camera and an identification unit, although not shown in the figure. The driver imaging camera is installed in front of a driver's seat to acquire a driver's face image by imaging a driver's face and supply it to the identification unit. The identification unit is preliminarily learned to detect positions of a pupil and a corneal reflection image of a light source, and identifies positions of the pupil and the corneal reflection image in a driver's eye included in the face image. The monitor device 16 detects a direction of the driver's line of sight based on a positional relationship between the pupil and the corneal reflection image.

The identification unit may be, for example, a convolutional neural network (CNN) having a plurality of layers connected in series from an input side to an output side. Face images including pupils and corneal reflection images are inputted to the CNN as teacher data, and training is performed, so that the CNN operates as a discriminator to identify positions of a pupil and a corneal reflection image. The monitor device 16 that detects a direction of the driver's line of sight may be a device of any configuration known in the art.

Furthermore, the driving assistance ECU 10 is connected with a display switch 18. The display switch 18 is provided in a position to be operated by the driver. As will be described in more detail below, when the display switch 18 is turned on, the driving assistance ECU 10 starts capturing an image of the rear of the vehicle by the camera sensor 12 and displaying the captured image.

The multimedia ECU 20 is connected with a display device 22 and a microphone 24. The display device 22 may be, for example, a head-up display or a multi-information display on which meters and various types of information are displayed, and may be a display of a navigation device.

The microphone 24 converts voice into an electrical signal to provide it to the multimedia ECU 20. The multimedia ECU 20, when it is determined by analyzing the electric signal that a command to display the image of the rear of the vehicle is included in the voice, outputs a command signal of the image display to the driving assistance ECU 10. Therefore, the driving assistance ECU 10, even when the display switch 18 is off, starts capturing an image of the rear of the vehicle by the camera sensor 12 and displaying the image.

The steering ECU 30 is connected with a turn lever 32 and turn lamps 34R, 34L. When the turn lever 32 is tilted in the vertical direction corresponding to the right-turn direction and the left-turn direction, it supplies a signal indicating the tilting to the steering ECU 30 to blink the right and left turn lamps 34R and 34L, respectively.

Although not shown in FIG. 1, the CAN 104 is connected with a drive ECU for controlling a drive device such as an engine and a brake ECU for controlling a brake device. The drive ECU controls a driving force of the vehicle by controlling the drive device, and the brake ECU controls a braking force of the vehicle by controlling the brake device.

Furthermore, the CAN 104 is connected with a driving operation sensor 40 and a vehicle status sensor 50. Information detected by the driving operation sensor 40 and the vehicle status sensor 50 (referred to as sensor information) is transmitted to the CAN 104. The sensor information transmitted to the CAN 104 is available in the respective ECUs as appropriate. Incidentally, the sensor information may be information of a sensor connected to a particular ECU and may be transmitted from that particular ECU to the CAN 104.

The driving operation sensor 40 includes a driving operation amount sensor that detects an operation amount on an accelerator pedal, a braking operation amount sensor that detects a pressing force on a brake pedal, a master cylinder pressure and the like. Furthermore, the driving operation sensor 40 includes a steering angle sensor that detects a steering angle $\theta$, a steering torque sensor that detects a steering torque Ts, and the like.

The vehicle status sensor 50 includes a vehicle speed sensor that detects a vehicle speed of the vehicle 102, a longitudinal acceleration sensor that detects a longitudinal acceleration of the vehicle, a lateral acceleration sensor that detects a lateral acceleration of the vehicle, and a yaw rate sensor that detects a yaw rate of the vehicle.

Figure 2:
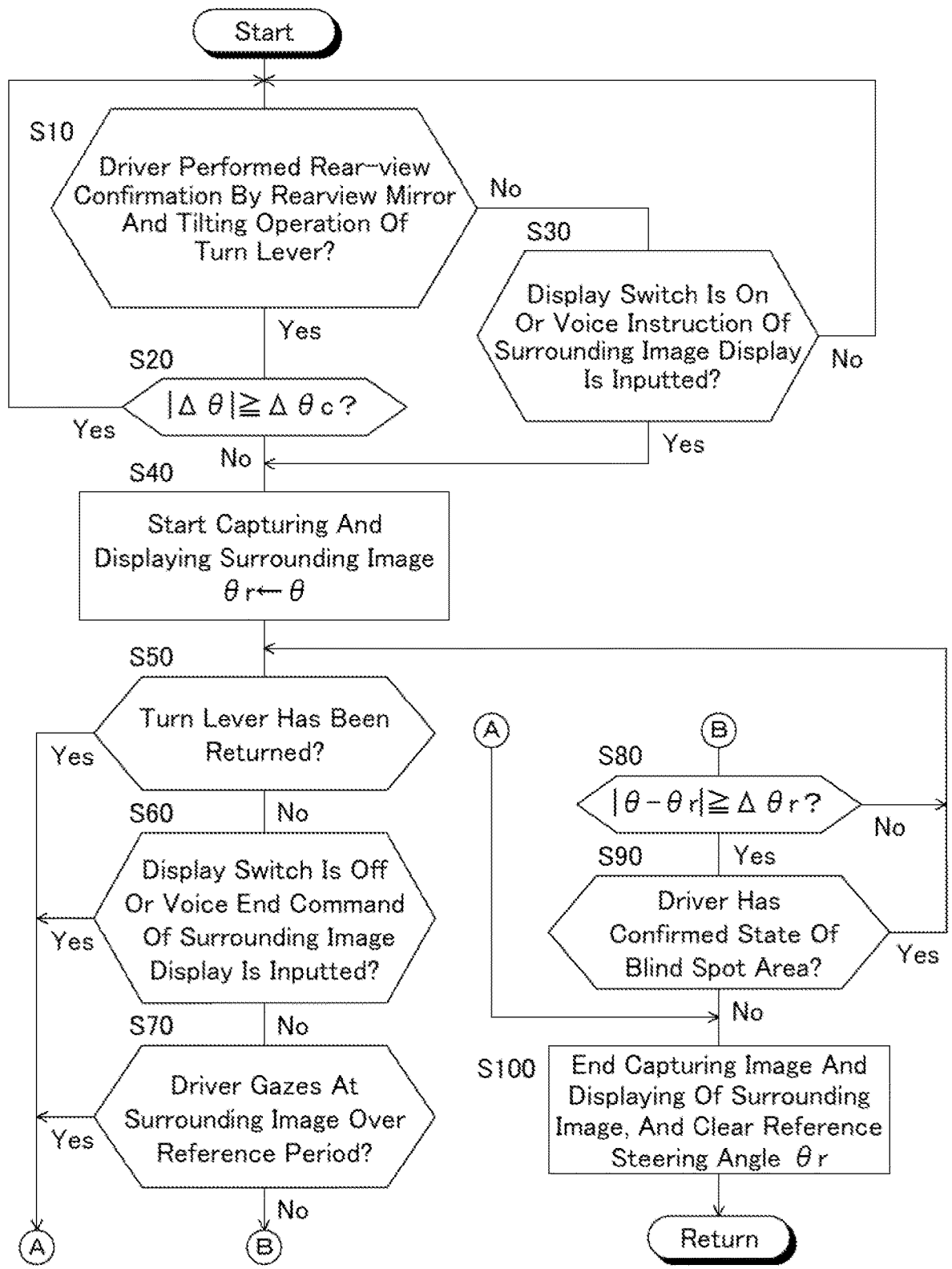
FIG. 2 is a flowchart showing a surrounding image display control routine in the first embodiment.

The ROM of the driving assistance ECU 10 stores a program of the surrounding image display control corresponding to the flowchart shown in FIG. 2. The CPU of the driving assistance ECU 10 reads the control program from the ROM to the RAM and executes the surrounding image display control in accordance with the flowchart shown in FIG. 2, as will be described in more detail later.

<Surrounding Image Display Control Program in the First Embodiment>

Next, the surrounding image display control program in the first embodiment will be described with reference to the flowchart shown in FIG. 2. The control in accordance with the flowchart shown in FIG. 2 is repeatedly performed by the CPU at predetermined time intervals when an ignition switch, not shown in FIG. 1, is on. In the first embodiment, the surrounding image display method in the first embodiment is executed by executing the surrounding image display control according to the flowchart shown in FIG. 2.

First, in step S10, the CPU determines whether or not a driver intends to make a lane departure by determining whether or not the driver has performed rear-view confirmation by a rearview mirror and tilting operation of the turn lever 32 within a preset determination time $\Delta t1$ (a positive constant). When a negative determination is made, the CPU advances the present control to the step S30, and when an affirmative determination is made, the CPU advances the present control to step S20.

Incidentally, the determination of whether or not the driver has performed the rear-view confirmation by the rearview mirror is performed based on a direction of a driver's line of sight detected by the monitor device 16. Further, the determination of whether or not the driver has performed the tilting operation of the turn lever 32 is performed based on the information about the turn lever supplied from the steering ECU 30. Further, in some embodiments, the rearview mirror may be a room mirror, but in some embodiments the rearview mirror is a side mirror such as a door mirror or a fender mirror.

An affirmative determination is made in step S10 in either of the following cases. Incidentally, when the side of the turn lamp which is flashed by the tilting of the turn lever and the side of the direction of the driver's line of sight with respect to the front-rear direction of the vehicle are different from each other, for example, when the former is left and the latter is right, an affirmative determination is not made in any of the following cases. X1: When it is determined that the driver has performed the tilting operation of the turn lever within a preset determination time $\Delta t1$ after it is determined that the driver performed the rear-view confirmation by the rearview mirror. X2: When it is determined that the driver has performed the rear-view confirmation by the rearview mirror within the preset determination time $\Delta t1$ after it is determined that the driver performed the tilting operation of the turn lever.

Figure 4:
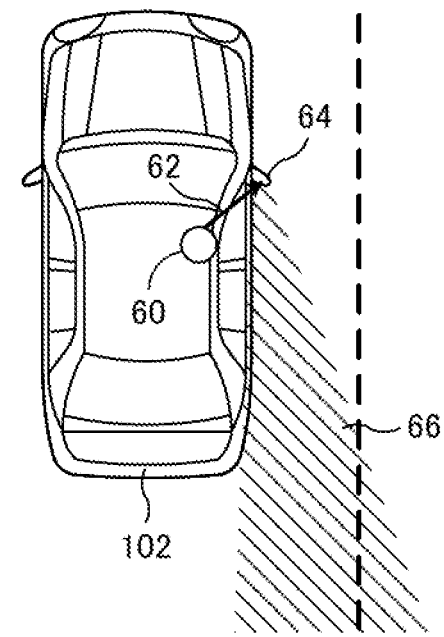
FIG. 4 is a diagram illustrating a line of sight of a driver when the driver intends to move a vehicle to a right lane.

For example, FIG. 4 illustrates a case in which a driver 60 attempts to move the vehicle 102 to the right lane. As shown in the figure, when it is detected that a line of sight 62 of the driver 60 is directed to a right door mirror 64 by the monitor device 16, it may be determined that the driver has performed the rear-view confirmation by the rear-view mirror.

In step S20, the CPU calculates an amount of change $\Delta\theta$ of the steering angle $\theta$ within a preset determination time $\Delta t2$ (a positive constant), and determines whether or not an absolute value of the amount of change $\Delta\theta$ is equal to or greater than a reference amount of change $\Delta\theta c$ (a positive constant), that is, whether or not a steering operation is performed by the driver. When an affirmative determination is made, the CPU terminates the present control once, and when a negative determination is made, the CPU advances the present control to step S40. Incidentally, step S20 is performed in order not to show the surrounding image in a situation where the steering operation is being performed by the driver.

In step S30, the CPU determines whether or not the display switch 18 is on, or whether or not a voice instruction of the surrounding image display is inputted via the microphone 24 based on the information supplied from the multimedia ECU 20. When the CPU determines that the display switch 18 is off and that no voice instruction of the surrounding image display is inputted, a negative determination is made and the CPU terminates the present control once. In contrast, when the CPU determines that the display switch 18 is on, or when the CPU determines that the voice instruction of the surrounding image display is inputted, an affirmative determination is made and the CPU advances the present control to step S40. Therefore, in step S30, the CPU determines whether or not the driver wants the displaying of the surrounding image.

In step S40, the CPU starts capturing an image of the rear of the vehicle 102 and the side of the vehicle on the lane departure side by the camera sensor 12, starts displaying the surrounding image acquired by the capturing, and sets a reference steering angle θr used in a determination of step S80 to be described later to a present steering angle θ.

In step S50, the CPU determines whether or not the turn lever 32 has been returned to a neutral position by the driver based on the information about the turn lever supplied from the steering ECU 30. When an affirmative determination is made, the CPU advances the present control to step S100, and when a negative determination is made, the CPU advances the present control to step S60.

In step S60, the CPU determines whether or not the display switch 18 is off or whether or not a voice end command of the surrounding image display is inputted via the microphone 24 based on the information supplied from the multimedia ECU 20. When it is determined that the display switch 18 is off, or when it is determined that the voice end command of the surrounding image display is inputted, an affirmative determination is made, and the CPU advances the present control to step S100. In contrast, when it is determined that the display switch 18 is on, or it is determined that the voice end command of the surrounding image display is not inputted, a negative determination is made, and the CPU advances the present control to step S70.

Figure 5:
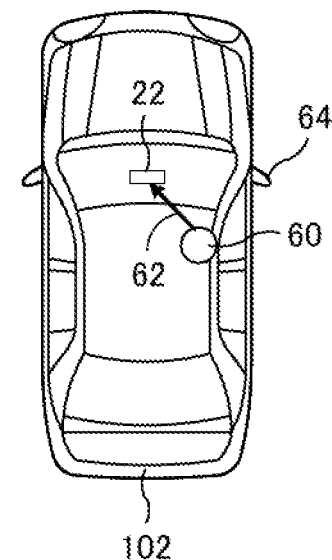
FIG. 5 is a diagram showing a situation in which the line of sight of the driver is directed to a display device.

In step S70, the CPU determines whether or not the driver gazes at a surrounding image displayed on the display device 22 for a reference period of time (a positive constant) or more based on the line of sight of the driver detected by the monitor device 16. When an affirmative determination is made, the CPU advances the present control to step S100, and when a negative determination is made, the CPU advances the present control to step S80. Incidentally, as shown in FIG. 5, when it is detected by the monitor device 16 that the line of sight 62 of the driver 60 is directed to the display device 22 for a period of time that is equal to or greater than the reference period of time, it may be determined that the driver gazes at a surrounding image displayed on the display device 22 for the a reference period of time or more.

In step S80, the CPU determines whether or not an absolute value of a difference θ−θr between a present steering angle θ and the reference steering angle θr set in step S40 is equal to or greater than a reference value Δθr (a positive constant), that is, whether or not a steering operation has been performed by the driver. When a negative determination is made, the CPU returns the present control to step S50, and when an affirmative determination is made, the CPU advances the present control to step S90.

In step S90, the CPU determines whether or not the driver has confirmed a state of a blind spot area. When an affirmative determination is made, the CPU returns the present control to step S50, and when a negative determination is made, the CPU advances the present control to step S100. In this case, when it is determined based on the direction of the driver's line of sight detected by the monitor device 16 that the driver's line of sight is directed to a side mirror such as a door mirror or a fender mirror on the side where the turn lever 32 is tilted, an affirmative determination may be made. Incidentally, in FIG. 4, the hatched area 66 shows an example of a blind spot area on which a situation confirmation can be made using a door mirror 64 on the right side.

Thus, in steps S80 and S90, it is determined whether or not the driver performed a steering operation without visually confirming the state of the blind spot area on the side of the lane departure. When affirmative and negative determinations are made in steps S80 and S90, respectively, it is determined that the driver performed a steering operation without visually confirming the state of the blind spot area on the side of the lane departure.

In step S100, the CPU terminates capturing an image of the rear of the vehicle 102 by the camera sensor 12, terminates the display of the surrounding image acquired by the capturing and clears the reference steering angle θr.

As will be understood from the above description, according to the first embodiment, in step S10, it is determined that the driver intends to make a lane departure, and when an affirmative determination is made, the displaying of a surrounding image is started in step S40.

Further, when it is determined in steps S80 and S90 that the driver performed a steering operation without visually confirming the state of the blind spot area on the side of the lane departure, in step S100, the displaying of the surrounding image is terminated.

Second Embodiment

The surrounding image display apparatus according to the second embodiment also has the same configuration as the configuration shown in FIG. 1. The ROM of the driving assistance ECU 10 stores the surrounding image display control program in the second embodiment corresponding to the flowchart shown in FIG. 3.

Figure 3:
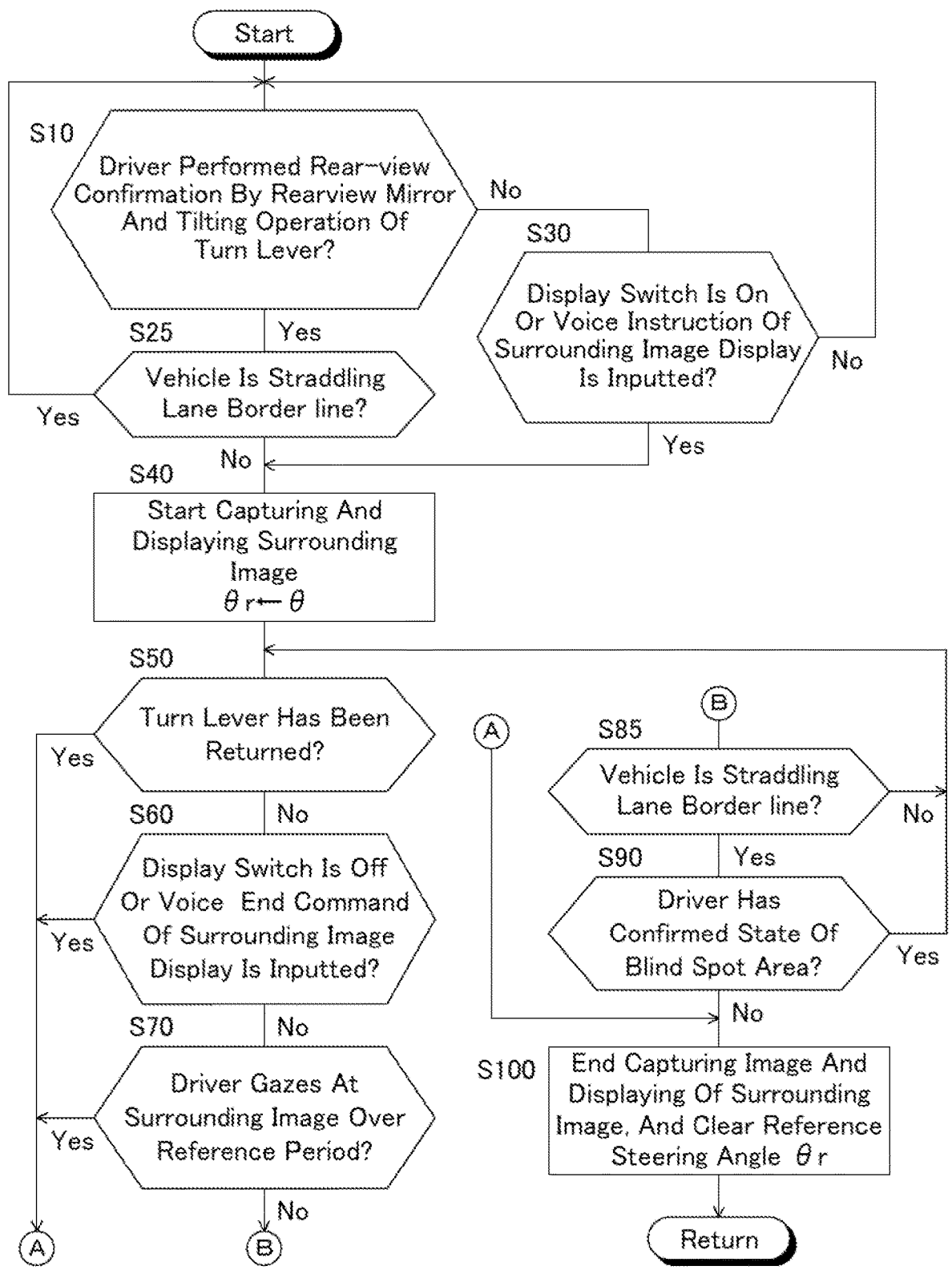
FIG. 3 is a flowchart showing a surrounding image display control routine in the second embodiment.

The surrounding image display control by the flowchart shown in FIG. 3 is also repeatedly performed by the CPU of the driving assistance ECU 10 when the ignition switch is on. In the second embodiment, the surrounding image display method in the second embodiment is executed by executing the surrounding image display control according to the flowchart shown in FIG. 3.

Figure 6:
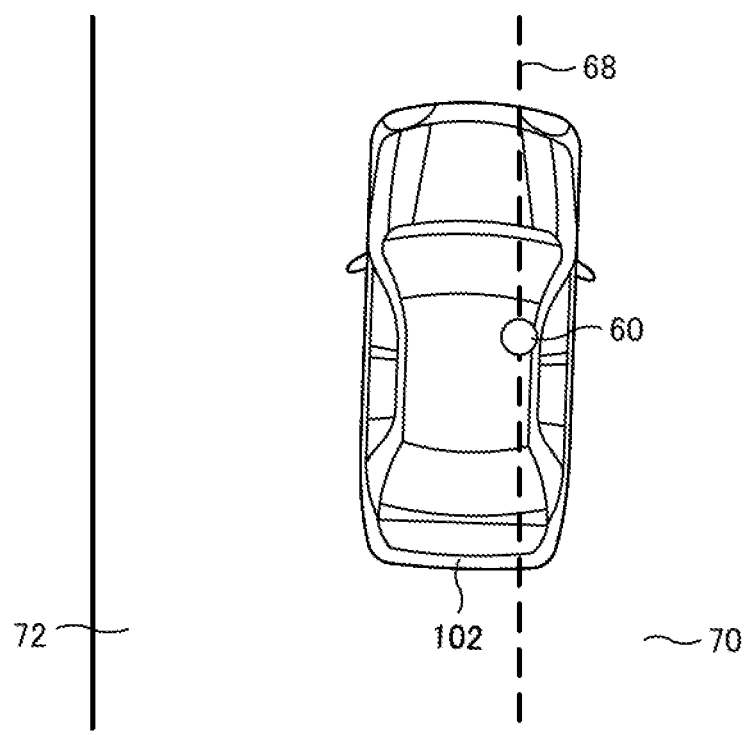
FIG. 6 is a diagram illustrating a situation in which a vehicle straddles a lane boundary line.

As can be seen from the comparison of FIGS. 3 and 2, the CPU of the driving assistance ECU 10 performs steps S25 and S85 instead of steps S20 and S80, respectively, in the first embodiment. In steps S25 and S85, the CPU determines whether or not the vehicle 102 is straddling a lane border line 68 on the side of the lane departure, as shown in FIG. 6, based on information provided by the camera sensor 12 that captures an image of the front of the vehicle 102, for example. It should be noted that when it is determined that a portion of the vehicle 102 is in a lane 70 ahead of the lane departure and the remaining portion of the vehicle 102 is in an original lane 72, it may be determined that the vehicle is straddling the lane border line 68 on the side of the lane departure.

As can be seen from the above description, the surrounding image display apparatus according to the second embodiment operates in the same manner as the surrounding image display apparatus according to the first embodiment except that it is determined whether or not the driver is steering in a lane departure direction by determining whether or not the vehicle 102 is straddling a lane border line 68 on the side of a lane departure.

Therefore, also in the second embodiment, in step S10, it is determined whether or not the driver intends to make a lane departure, and when an affirmative determination is made, the displaying of the surrounding image is started in step S40.

Further, when it is determined in steps S85 and S90 that the driver performed a steering operation without confirming visually a state of the blind spot area on the side where a lane departure is made, in step S100, the displaying of the surrounding images is terminated.

Therefore, according to the first and second embodiments, since the driver cannot see a surrounding image due to the end of the display of the surrounding image, it is possible to increase the possibility that the driver will visually confirm a situation of the blind spot area on the side of the lane departure, thereby reducing the risk of the driver neglecting to confirm the situation of the blind spot area.

In particular, according to the first and second embodiments, when it is determined that a confirming of the rear by the rear view mirror and a tilting operation of the turn lever have been performed by the driver within the preset determination time Δt1 (S10), it is determined that the driver intends to make a lane departure. Therefore, when the driver intends to make the vehicle depart from a lane, it is possible to determine that the driver intends to make a lane departure.

Further, according to the first and second embodiments, when it is determined that the driver gazes at the display device for a preset reference time or more (S70), the displaying of the surrounding image is terminated. Therefore, since the driver can no longer see the surrounding image, it is possible to increase the possibility that the driver visually confirms the situation of the blind spot area on the side of the lane departure.

Further, according to the first and second embodiments, even if it is determined that the driver intends to make a lane departure, when it is determined that a steering operation is performed by the driver (S20, S25), the displaying of the surrounding image is not started. Therefore, since the surrounding image is not displayed in the situation where a steering operation is performed by the driver, it is possible to prevent the driver from moving his or her line of sight to the display device during the steering operation. Therefore, when it is determined that the driver intends to make a lane departure, it is possible to improve safety in a situation in which the driver tries to make the vehicle depart from the lane as compared to where a surrounding image is displayed regardless of whether or not a steering operation is performed by the driver.

While the present disclosure has been described in detail with reference to specific embodiments, it will be apparent to those skilled in the art that the present disclosure is not limited to the embodiments described above, and various other embodiments are possible within the scope of the present disclosure.

For example, in the first and second embodiments described above, in step S40, capturing of an image and displaying of a surrounding image are started, in step S100, the capturing of an image and displaying of a surrounding image are terminated. However, image capturing by the camera sensor 12 may always be performed, in step S40, the displaying of the surrounding image may be started, and in step S100, the displaying of the surrounding image may be terminated.

In the above-described first embodiment, in step S10, it is determined whether or not a driver intends to make a lane departure, and in step S20, it is determined whether or not a steering operation is performed by the driver. Similarly, in the above-described second embodiment, in step S10, it is determined whether or not a driver intends to make a lane departure, and in step S25, it is determined whether or not a steering operation is performed by the driver. However, steps S20 and S25 may be omitted.

Further, the above-described first and second embodiments may be integrated. For example, when a negative determination is made in step S20, step S25 may be performed. Further, when a negative determination is made in step S80, step S85 may be performed.

What is claimed is:

1. A surrounding image display apparatus comprising:
   a camera that captures an image of a surrounding of a vehicle;
   a display that displays a surrounding image captured by the camera; and
   an electronic control unit that controls the display, the electronic control unit is configured to start displaying the surrounding image when it is determined that a driver intends to make a lane departure, and end the displaying of the surrounding image when it is determined that the driver has performed a steering operation without visually confirming a situation of a blind spot on the side of the lane departure.

2. The surrounding image display apparatus according to claim 1, wherein the electronic control unit is configured to determine that the driver intends to make a lane departure when it is determined that the driver has confirmed the rear of the vehicle using a rearview mirror and tilted a turn lever within a preset determination time.

3. The surrounding image display apparatus according to claim 1, wherein the electronic control unit is configured to end the displaying of the surrounding image when it is determined that the driver gazes at the display for a preset reference time or more.

4. A surrounding image display method comprising:
   displaying a surrounding image captured by camera that captures an image of a surrounding of a vehicle on a display;
   starting displaying the surrounding image when it is determined that a driver intends to make a lane departure; and
   ending the displaying of the surrounding image when it is determined that the driver has performed a steering operation without visually confirming a situation of a blind spot on the side of the lane departure.

5. A non-transitory computer-readable storage medium storing a program for executing a surrounding image display control, the program causing a computer to:
   display a surrounding image captured by a camera that captures an image of a surrounding of the vehicle;
   start displaying the surrounding image when it is determined that a driver intends to make a lane departure; and end the displaying of the surrounding image when it is determined that the driver has performed a steering operation without visually confirming a situation of a blind spot on the side of the lane departure.

* * * * *